(12) United States Patent
Jouhikainen et al.

(10) Patent No.: US 9,710,850 B2
(45) Date of Patent: Jul. 18, 2017

(54) SYSTEMS AND METHODS FOR AGGREGATING AND MANAGING FINANCIAL SERVICE ACCOUNTS

(71) Applicants: Hannes M. Jouhikainen, Arlington, VA (US); Luke A. Hammock, Washington, DC (US); Janusz M. Niczyporuk, Vienna, VA (US)

(72) Inventors: Hannes M. Jouhikainen, Arlington, VA (US); Luke A. Hammock, Washington, DC (US); Janusz M. Niczyporuk, Vienna, VA (US)

(73) Assignee: CAPITAL ONE FINANCIAL CORPORATION, McLean, VA (US)

( * ) Notice: Subject to any disclaimer, the term of this patent is extended or adjusted under 35 U.S.C. 154(b) by 98 days.

(21) Appl. No.: 14/089,180

(22) Filed: Nov. 25, 2013

(65) Prior Publication Data
US 2014/0258091 A1 Sep. 11, 2014

Related U.S. Application Data

(60) Provisional application No. 61/776,284, filed on Mar. 11, 2013.

(51) Int. Cl.
*G06Q 40/02* (2012.01)
*G06Q 20/22* (2012.01)

(52) U.S. Cl.
CPC .......... *G06Q 40/02* (2013.01); *G06Q 20/227* (2013.01); *G06Q 40/025* (2013.01)

(58) Field of Classification Search
None
See application file for complete search history.

(56) References Cited

U.S. PATENT DOCUMENTS

2008/0277465 A1* 11/2008 Pletz et al. .................. 235/379

\* cited by examiner

*Primary Examiner* — Robert R Niquette
*Assistant Examiner* — Joseph W King
(74) *Attorney, Agent, or Firm* — Finnegan, Henderson, Farabow, Garrett & Dunner LLP

(57) ABSTRACT

The disclosed embodiments include methods and systems for providing an aggregated financial service account based on multiple private label financial accounts. In one embodiment, a process is disclosed that may include receiving a first request from a user for a first private label financial account that is usable for purchases associated with a first merchant and approving the first request for the first private label financial account. The method may also include receiving a request from the user for a second private label financial account that is usable for purchases associated with a second merchant and approving the second request for the second private label financial account. In one aspect, the method may also include generating an aggregated financial account based on the first and second private label accounts such that the aggregated financial account may be used for purchases with the first merchant or with the second merchant.

17 Claims, 16 Drawing Sheets

| | | | FINANCIAL SERVICE ACCOUNT 500 | | | |
|---|---|---|---|---|---|---|
| PRIVATE LABEL MERCHANT 305 | PARAMETER 310 (E.G., CREDIT LIMIT) | PARAMETER 315 (E.G., BALANCE) | PARAMETER 320 (E.G., PAYMENT DUE DATE) | PARAMETER 325 (E.G., PAYMENT AMOUNT) | PARAMETER 330 (E.G., APR%) |
| MERCHANT A | $5,000.00 | $3,000.00 | JUNE 15, 2013 | $100.00 | 9% |
| ⁂ | | | | | |
| MERCHANT B | $1,000.00 | $800.00 | May 31, 2013 | $10.00 | 13% |

FIGURE 5

| FINANCIAL SERVICE ACCOUNT 600 | | | | | |
|---|---|---|---|---|---|
| MERCHANT A | $5,000.00 | $3,000.00 | JUNE 15, 2013 | $100.00 | 9% |
| MERCHANT B | $1,000.00 | $800.00 | May 31, 2013 | $10.00 | 13% |
| AGGREGATED ACCOUNT | $6000.00 | $3800.00 | June 1, 2013 | $110.00 | 13% |

FIGURE 6

SYSTEMS AND METHODS FOR AGGREGATING AND MANAGING FINANCIAL SERVICE ACCOUNTS

CROSS REFERENCE TO RELATED APPLICATION

This disclosure claims priority under 35 U.S.C. §119 to U.S. provisional patent application No. 61/776,284, filed on Mar. 11, 2013, and entitled "Systems and Methods for Aggregating and Managing Financial Service Accounts," which is incorporated herein by reference in its entirety.

TECHNICAL FIELD

The disclosed embodiments relate generally to account management technologies and, in particular, to methods and systems for providing social discovery relationships.

BACKGROUND

To stay ahead of competitors, large merchants offer incentives to motivate customers to shop at their locations, whether online or at the store location. A common incentive used by merchants is the private label credit card (e.g., store credit cards). These cards provide merchants a means to increase loyalty, target offers, track consumer purchases, reduce card processing costs, and increase brand awareness. Consumers also benefit from using private label cards in the form of rewards, discounts, and access to credit.

Typically, each private label credit card held by a consumer is managed independently, meaning that every card carries separate credit exposure and credit score impact, and is billed separately. To reduce the impact on credit scores and minimize the complexities associated with separate billing processes, consumers are motivated to carry only a relatively small number of private label credit cards.

SUMMARY

Consistent with the disclosure, systems and methods are provided for providing an aggregated financial service account. In one embodiment, a system is disclosed that may include, for example, one or more memory devices storing software instructions. The system may also include one or more processors configured to execute the software instructions to receive a first request from a user for a first private label financial account that is usable for purchases associated with a first merchant. The one or more processors may also be configured to approve the first request for the first private label financial account and receive a request from the user for a second private label financial account that is usable for purchases associated with a second merchant. The one or more processors may also be configured to approve the second request for the second private label financial account and generate an aggregated financial account based on the first and second private label accounts such that the aggregated financial account may be used for purchases with the first merchant or with the second merchant.

The disclosed embodiments may also include a method for providing an aggregated financial service account. The method may include, receiving a first request from a user for a first private label financial account that is usable for purchases associated with a first merchant. The method may also include approving, by the one or more processors, the first request for the first private label financial account, and receiving a request from the user for a second private label financial account that is usable for purchases associated with a second merchant. In certain aspects, the method may further include approving, by the one or more processors, the second request for the second private label financial account, and generating, by the one or more processors, an aggregated financial account based on the first and second private label accounts such that the aggregated financial account may be used for purchases with the first merchant or with the second merchant.

It is to be understood that both the foregoing general description and the following detailed description are exemplary and explanatory only and are not restrictive of the disclosed embodiments, as claimed.

The accompanying drawings, which are incorporated in and constitute a part of this specification, illustrate disclosed embodiments and, together with the description, serve to explain the disclosed embodiments.

BRIEF DESCRIPTION OF THE DRAWINGS

FIG. 5 is a block diagram of an exemplary data structure associated with a financial service account, consistent with certain disclosed embodiments.

FIG. 6 is a block diagram of another exemplary data structure associated with a financial service account, consistent with certain disclosed embodiments.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

The disclosed embodiments provide an aggregation and management platform for private label credit cards that extend the benefits of such financial service products to a broader merchant base. The disclosed embodiments provide a platform that allows a consumer to carry a single credit exposure that is dynamically allocated to a number of private label credit cards. The disclosed embodiments provide processes that relieve a consumer of separate credit score impacts associated with individual cards while providing the convenience of managing only one financial service account. The disclosed embodiments also enable merchants to retain the loyalty and targeting features provided by private label cards. The disclosed embodiments are applicable to electronic financial service accounts, such as a digital wallet, and to plastic based financial accounts, such as a plastic credit card physically held and used by a consumer at point of sale locations.

Although disclosed embodiments are discussed primarily in the context of private label financial accounts, other applications are contemplated. For example, disclosed embodiments may be also used with other types of financial accounts, such as bank accounts (e.g., savings, checking, etc.), loyalty cards, and the like. For instance, aspects of the disclosed embodiments may be used with loyalty cards provided by a merchant that offers incentives based on the number of purchases by the consumer (e.g., buy five cups of coffee and get the sixth one free).

Figure 1:
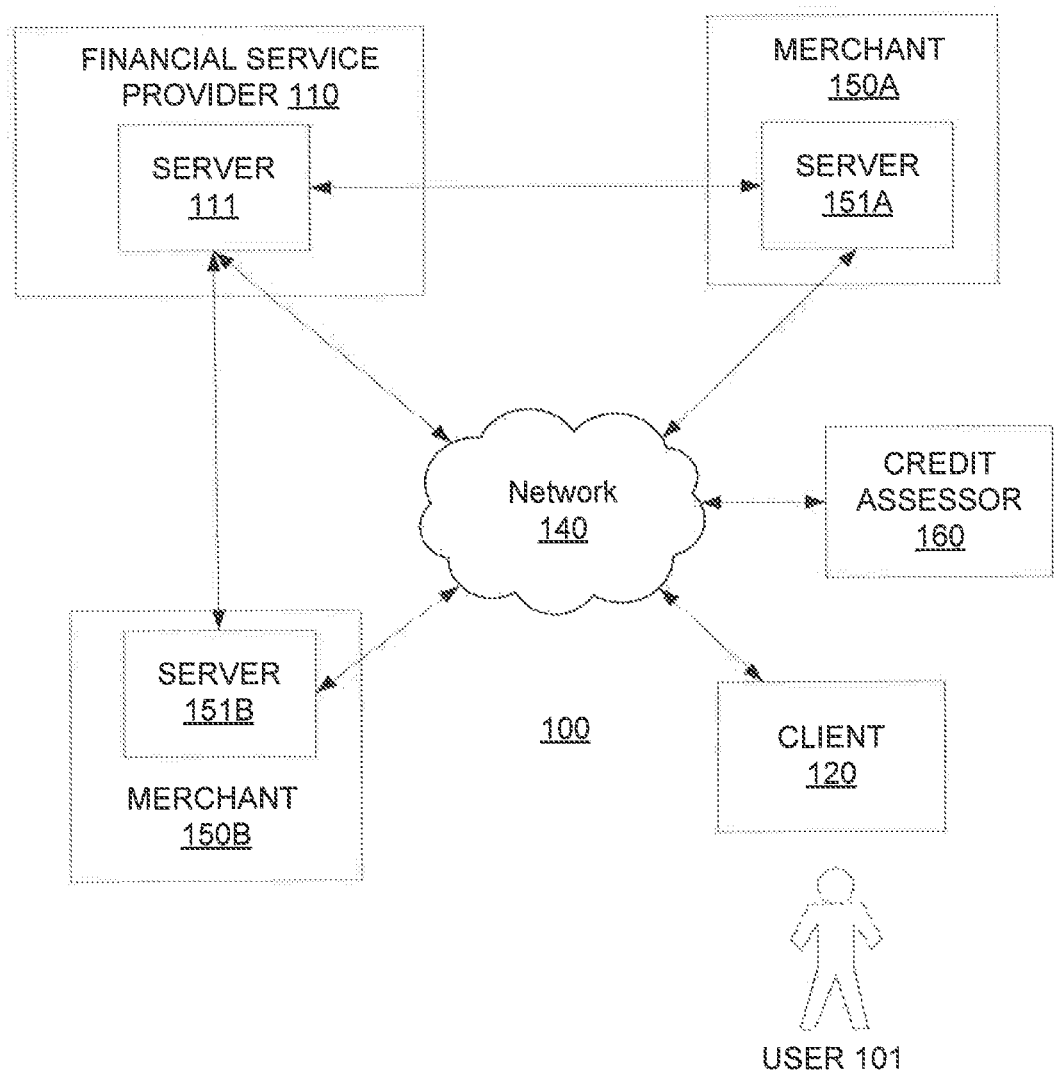
FIG. 1 illustrates an exemplary system consistent with disclosed embodiments.

FIG. 1 is a diagram illustrating an exemplary system 100 for performing one or more operations consistent with the disclosed embodiments. In one embodiment, system 100 may include a financial service provider 110, client 120, one or more merchants 150 (exemplary merchants 150A and 150B shown), a credit assessor 160, and network 140. The components and arrangement of the components included in system 100 may vary. Thus, system 100 may further include other components that perform or assist in the performance of one or more processes consistent with the disclosed embodiments.

Financial service provider 110 may be an entity that provides financial services. For example, financial service provider 110 may be a bank, credit card issuer, or other type of financial service entity that generates, provides, manages, and/or maintains financial service accounts for one or more users. Financial service accounts may include, for example, credit card accounts, checking accounts, savings accounts, reward accounts, and any other types of financial service account known to those skilled in the art. Financial service accounts may be associated with electronic accounts, such as a digital wallet or similar account that may be used to perform electronic transactions, such as purchasing goods and/or services online. Financial service accounts may also be associated with physical financial service account cards, such as a plastic credit or check card that a user may carry on their person and use to perform financial service transactions, such as purchasing goods and/or services at a point of sale (POS) terminal. Financial service provider 110 may include infrastructure and components that are configured to generate and provide financial service accounts and financial service account cards (e.g., credit cards, check cards, etc.).

In one embodiment, financial service provider 110 may include one or more computing systems that are configured to execute software instructions stored on one or more memory devices to perform one or more operations consistent with the disclosed embodiments. In one embodiment, financial service provider 110 may include server 111. Server 111 may be one or more computing devices configured to execute software instructions stored in memory to perform one or more processes consistent with the disclosed embodiments. For example, server 111 may include one or more memory device(s) storing data and software instructions and one or more processor(s) configured to use the data and execute the software instructions to perform server-based functions and operations known to those skilled in the art. Server 111 may also be configured to execute stored software instructions to perform operations associated with aggregating and managing multiple private label financial service accounts in a manner consistent with the disclosed embodiments. In one embodiment, a private label financial account may include a financial account that is provided by a specific entity (e.g., merchants, etc.) that can be used to purchase goods and/or services from that entity (e.g., a merchant-based credit card usable for purchases at that merchant's store locations (e.g., online or brick and mortar locations). The disclosed embodiments are applicable to any type of private label account, such as, for example: private label/store credit financial accounts, private label debit accounts, gift accounts, prepaid, and other stored value accounts (e.g., rewards/loyalty points), etc. Moreover, in certain embodiments, credit accounts may include, for example, lines of credit, credit card accounts, promotional financing accounts, long term financing accounts, transactional credit accounts, and installment can accounts.

Server 111 may be a general purpose computer, a mainframe computer, or any combination of these components. In certain embodiments, server 111 (or a system including server 111) may be configured as a particular apparatus, system, and the like based on the storage, execution, and/or implementation of the software instructions that perform one or more operations consistent with the disclosed embodiments. Server 111 may be standalone, or it may be part of a subsystem, which may be part of a larger system. For example, server 111 may represent distributed servers that are remotely located and communicate over a network (e.g., network 140) or a dedicated network, such as a LAN, for financial service provider 110.

Server 111 may include or may connect to one or more storage devices configured to store data and/or software instructions used by one or more processors of server 111 to perform operations consistent with disclosed embodiments. For example, server 111 may include memory configured to store one or more software programs that performs several functions when executed by a processor. The disclosed embodiments are not limited to separate programs or computers configured to perform dedicated tasks. For example, server 111 may include memory that stores a single program or multiple programs. Additionally, server 111 may execute one or more programs located remotely from server 111. For example, server 111 may access one or more remote programs stored in memory included with a remote component that, when executed, perform operations consistent with the disclosed embodiments. In certain aspects, server 111 may include web server software that generates, maintains, and provides web site(s) that are accessible over network 140. In other aspects, financial server provider 110 may connect separate web server(s) or similar computing devices that generate, maintain, and provide web site(s) for financial service provider 110.

Network 140 may be any type of network configured to provide communications between components of system 100. For example, network 100 may be any type of network (including infrastructure) that provides communications, exchanges information, and/or facilitates the exchange of information, such as the Internet, a Local Area Network, or other suitable connection(s) that enables the sending and receiving of information between the components of system 100. In other embodiments, one or more components of system 100 may communicate directly through a dedicated communication link(s), such as the exemplary links between financial service provider 110 and merchants 150A and 1503.

Client 120 may be one or more computing devices that are configured to execute software instructions for performing one or more operations consistent with the disclosed embodiments. Client 120 may be a desktop computer, a laptop, a server, a mobile device (e.g., tablet, smart phone, etc.), and any other type of computing device. Client 120 may include one or more processors configured to execute software instructions stored in memory, such as memory included in client 120. Client 120 may include software that when executed by a processor performs known Internet-related communication and content display processes. For instance, client 120 may execute browser software that generates and displays interfaces including content on a display device included in, or connected to, client 120. The disclosed embodiments are not limited to any particular configuration of client 120. For instance, client 120 may be a mobile device that stores and executes mobile applications that provide financial service related functions offered by financial service provider 110 and/or merchants 150A, 1503, such as a banking mobile application for checking balances, paying bills, etc.

In one embodiment, a user 101 may use client 120 to perform one or more operations consistent with the disclosed embodiments. In one aspect, user 101 may be a customer of financial service provider 110. For instance, financial service provider may maintain a financial service account (e.g., credit card account) for user 101 that user 101 may use to purchase goods and/or services online or at brick and mortar locations associated with a merchant. In other embodiments, user 101 may be a potential customer of financial service provider 110 or may not be affiliated with financial service provider 110 from the user's perspective and/or the financial service provider 110's perspective.

Merchants 150A and 150B may each be an entity that provides goods and/or services (e.g., a retail store). While FIG. 1 shows two merchants 150A and 150B in system 100, the disclosed embodiments may be implemented in a system involving a single merchant 150 or multiple merchants (e.g., two or more merchants). A merchant 150 may include brick and mortar location(s) that a consumer (e.g., user 101) may physically visit and purchase goods and services. Such physical locations may include computing devices that perform financial service transactions with consumers (e.g., POS terminal(s), kiosks, etc.). They may also include back and/or front-end computing components that store data and execute software instructions to perform operations consistent with disclosed embodiments, such as computers that are operated by employees of merchant 150 (e.g., back office systems, etc.). In certain embodiments, merchants 150 may also include merchants that provide electronic shopping mechanisms, such as a website or similar online location that consumers may access using a computer (e.g., client 120) through browser software or similar software.

In one embodiment, merchants 150A and 150B include server 151A and 151B, respectively. Server 151 may be one or more computing devices configured to execute software instructions stored in memory to perform one or more processes consistent with the disclosed embodiments. For example, server 151 may include one or more memory device(s) storing data and software instructions and one or more processor(s) configured to use the data and execute the software instructions to perform server-based functions and operations known to those skilled in the art. Server 151 may also be configured to execute stored software instructions to perform operations associated with merchant 150, including one or more processes associated with providing private label financial service accounts. Server 151 may be a general purpose computer, a mainframe computer, or any combination of these components. In certain embodiments, server 151 (or a system including server 151) may be configured as a particular apparatus, system, and the like based on the storage, execution, and/or implementation of the software instructions that perform one or more operations consistent with the disclosed embodiments. Server 151 may be stand-alone, or may be part of a subsystem, which may be part of a larger system. For example, server 151 may represent distributed servers that are remotely located and communicate over a network (e.g., network 140) or a dedicated network, such as a LAN, for merchant 150.

In certain aspects, server 151 may include web server software that generates, maintains, and provides web site(s) for a respective merchant 150 that is accessible over network 140. In other aspects, merchant 150 may connect separate to web server(s) or similar computing devices that generate, maintain, and provide web site(s) for merchant 150. For example, merchant 150A may use web server(s) that provide a web site specific to merchant 150A, and allows user 101 to access, view, and purchase goods and/or services from merchant 150A. Similarly, merchant 150 B may use web server(s) that provide a web site specific to merchant 150B and allows user 101 to access, view, and purchase goods and/or services from merchant 150B.

In accordance with certain aspects of the disclosed embodiments, merchant 150A may offer and provide private label financial service accounts (e.g., private label credit card accounts) associated with merchant 150A and merchant 150B may offer and provide private label financial service accounts (e.g., private label credit card accounts) associated with merchant 150B. In certain configurations, financial service provider 110 may assist merchant 150A and/or merchant 150B with providing, maintaining, offering, and managing the private label financial service accounts.

Credit assessor 160 may be an entity that performs credit assessments for consumers. For example, credit assessor 160 may be an entity that provides credit evaluation services to consumers (e.g., user 101) and/or financial service related entities (e.g., merchants 150 and financial service provider 110). In one example, credit assessor 160 may be an entity that provides credit scores to a consumer (e.g., user 101) based on the credit history for that consumer. Credit assessor 160 may also provide credit assessments to financial service provider 110 for consumers attempting to apply for financial service accounts offered by financial service provider 110 and/or merchants 150A and/or 150B. Credit assessor 160 may include computing components known to those skilled in the art to provide credit check and assessment services and to provide information relating to the credit check and assessment services over network 140, such as a web server providing a web site accessible by user 101 or a server that communicates with server 111 and/or servers 151A and/or 151B. The disclosed embodiments are not limited to any particular configuration of the computing components used by credit assessor 160.

Figure 2:
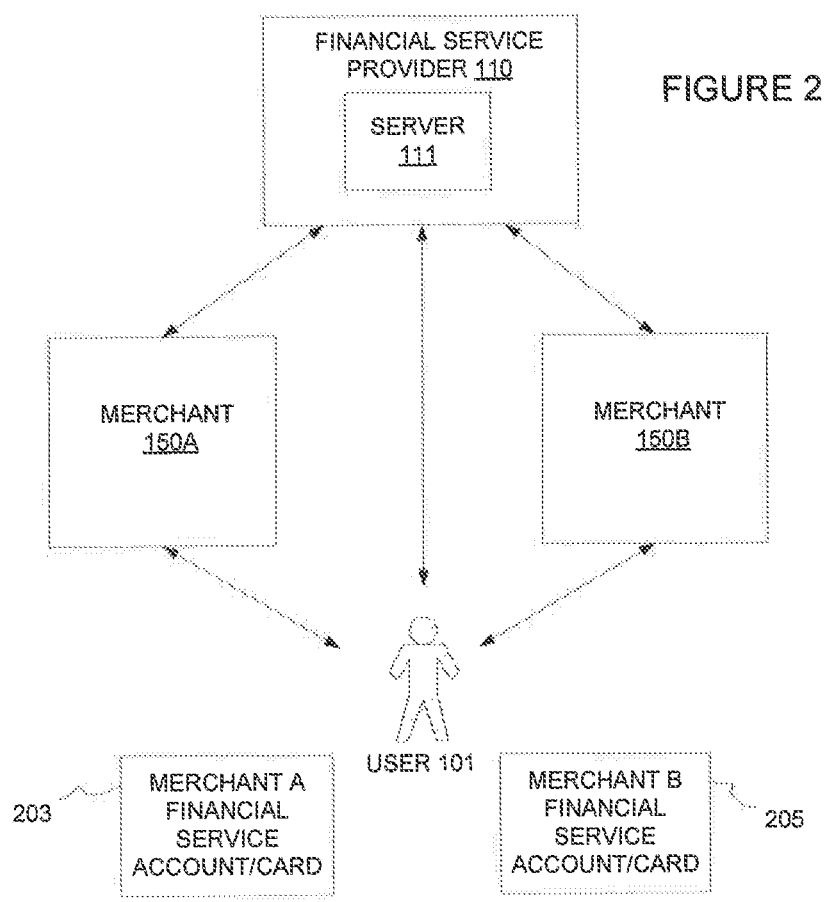
FIG. 2 is a block diagram of one or more process flows associated with an exemplary arrangement consistent with disclosed embodiments.

As explained, the disclosed embodiments include methods and systems for aggregating and managing private label financial service accounts. FIG. 2 shows a block diagram of one or more process flows associated with an exemplary arrangement consistent with disclosed embodiments. In one aspect, user 101 may request and obtain private label financial service accounts from merchants 150A and 150B. In one aspect, user 101 may receive physical cards (e.g., plastic credit cards) that are branded for each merchant. For instance, user 101 may hold a financial service account 203 that is branded with merchant A that can be used by user 101 to purchase goods and/or services from merchant 150A electronically (e.g., such as online shopping). Financial service account 203 may include a plastic (or similar) card that can be used by user 101 to purchase goods and/or services from merchant 150A at a brick and mortar location of merchant 150A. Similarly, user 101 may hold a financial service account 205 that is branded with merchant B that can be used to purchase goods and/or services from merchant 150B electronically. Financial service account 205 may also include a plastic (or similar) card that user 101 can use to purchase goods and/or services from merchant 150B at a brick and mortar location of merchant 150B. In certain embodiments, financial service account 203 may only be used to purchase goods and/or services from merchant 150A and financial service account 205 may only be used to purchase goods and/or services from merchant 150B.

User 101 may also hold a general purpose financial service account with financial service provider 110 (in electronic and/or physical card form) that can be used to purchase goods and/or services from merchants 150A and/or 150B or other merchants. In certain aspects, financial service provider 110 is configured to perform processes for aggregating and managing the private label accounts provided by merchants 150A and 150B.

In other aspects of the disclosed embodiments, financial service provider 110 may generate a single aggregated financial account that encompasses private label accounts from merchant 150A and merchant 150B. For example, financial service provider 110 may be configured to execute software instructions (via server 111) that create and store an aggregated financial service account that can be used by user 101 only for purchases associated with merchant 150A and/or merchant 150B.

Figure 3:
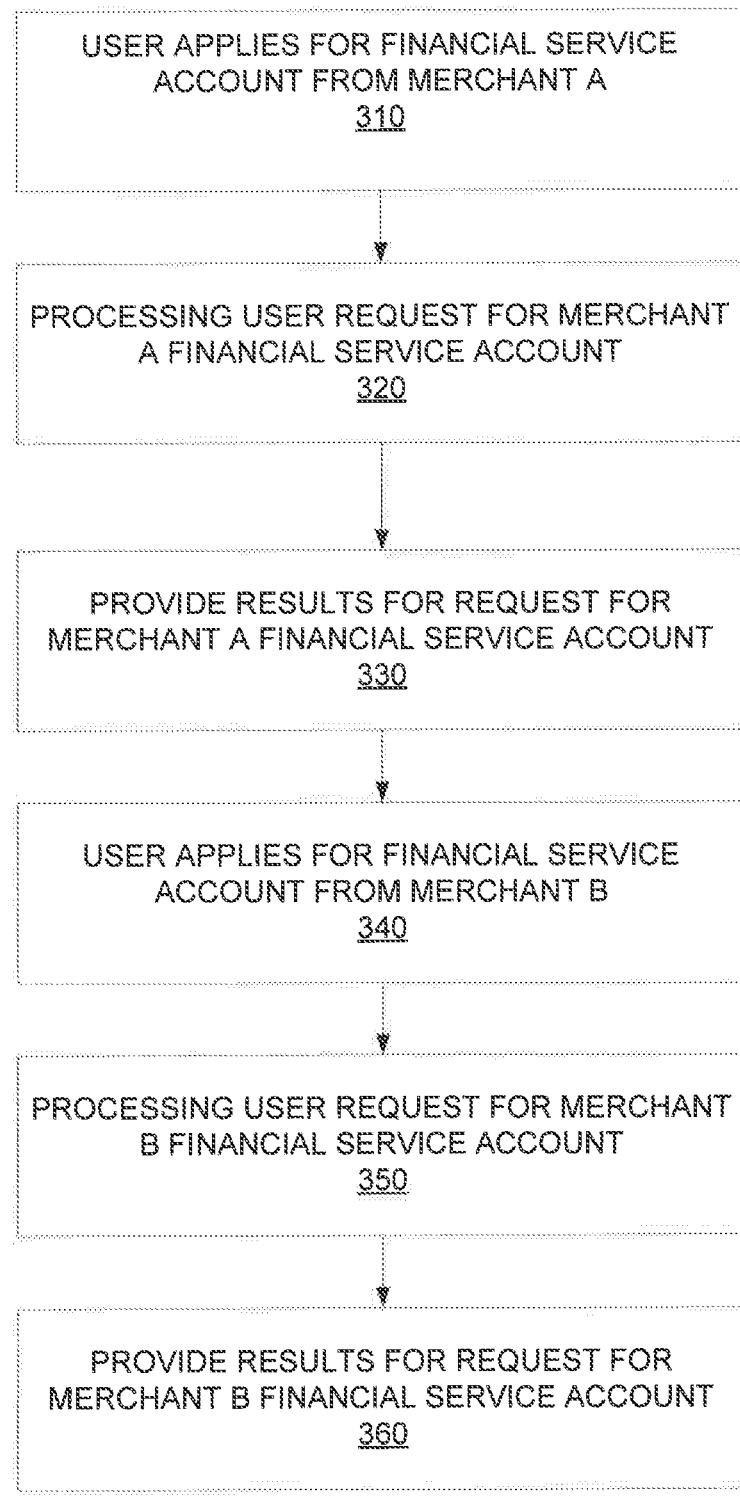
FIG. 3 is a flowchart of an exemplary financial service account application process, consistent with disclosed embodiments.

FIG. 3 is a flowchart of an exemplary financial service account application process consistent with certain disclosed embodiments. In one aspect, user 101 may apply for a private label financial service account from merchant A (step 310). User 101 may apply for the merchant A private label account using client 120. For example, user 101 may use client 120 to access an online application web page provided by merchant 150A via the Internet (e.g., network 140). Alternatively, user 101 may fill out an application for the merchant A private label account at a physical location of merchant 150A, via, for example, a kiosk or by filling out an application using pen and paper. For the latter, merchant 150A may include infrastructure and components for converting user 101's application into electronic form for subsequent processing by computing device(s).

The disclosed embodiments may process user 101's request for the merchant A private label account (step 320). In one embodiment, merchant chant 150A and financial service provider 110 may perform one or more operations associated with processing the request. For example, in one aspect, merchant 150A (via server 151A) may generate a request for the user 101's application and provide the request to server 111 of financial service account provider 110. The request may be communicated over network 140. Server 111 may be configured to process the request by performing known credit history checks. For example, server 111 may send a request to credit assessor 160 for credit information relating to user 101. Credit assessor 160 may perform processes for determining credit results (e.g., a credit score, summary credit information, etc.) and provide the results of such processes to financial service provider 111.

Based on user 101's credit history information (or score) received from credit assessor 160, financial service provider 111 may generate and provide results for user 101's request for merchant A's private label account (e.g., step 330). In one embodiment, financial service provider 111 may provide the results of user 101's merchant A private label account request to merchant 150A. In turn, merchant 150A may generate and provide a notification to client 120 (or directly to user 101) informing user 101 whether the request was approved. In other embodiments, financial service provider 110 (e.g., via server 111) may generate and provide a notification to client 120 informing user 101 whether the request was approved. In certain aspects, explained further below, financial service provider 110 (e.g., via server 111) may provide the notification with branded labels associated with merchant A. For instance, the notification may include information and have a look and feel as if it came directly from merchant A (e.g., merchant A logos, text, etc.) even though the notification originated from financial service provider 110.

In some embodiments, user 101 may also apply for a private label financial service account from merchant B (step 340). User 101 may apply for the merchant B private label account using client 120. For example, user 101 may use client 120 to access an online application web page provided by merchant 150B via the Internet (e.g., network 140). Alternatively, user 101 may fill out an application for the merchant B private label account at a physical location of merchant 150B, via, for example, a kiosk or by filling out an application using pen and paper. For the latter, merchant 150B may include infrastructure and components for converting user 101's application into electronic form for subsequent processing by computing device(s).

The disclosed embodiments may process user 101's request for the merchant B private label account (step 350). In one embodiment, merchant 150B and financial service provider 110 may perform one or more operations associated with processing the request. For example, in one aspect, merchant 150B (via server 151B) may generate a request for the user 101's application and provide the request to server 111 of financial service account provider 110. The request may be communicated over network 140. Server 111 may be configured to process the request by performing known credit history checks. In one aspect, server 111 may send a request to credit assessor 160 for credit information relating to user 101. Credit assessor 160 may perform processes for determining credit results (e.g., a credit score, summary credit information, etc.) and provide the results of such processes to financial service provider 111.

In other aspects, server 111 may be configured to locally process the user 101's request to form an aggregated financial service account consistent with the disclosed embodiments. In these embodiments, server 111 may bypass credit assessor 160 to approve user 101's request for a merchant B private label account.

In certain aspects, financial service provider 111 may generate and provide results for user 101's request for merchant B's private label account (e.g., step 360). In one embodiment, financial service provider 111 may provide the results of user 101's merchant B private label account request to merchant 150B. In turn, merchant 150B may generate and provide a notification to client 120 (or directly to user 101) informing user 101 whether the request was approved. In other embodiments, financial service provider 110 (e.g., via server 111) may generate and provide a notification to client 120 informing user 101 whether the request for the merchant B private label account was approved. In certain aspects, explained further below, financial service provider 110 (e.g., via server 111) may provide the notification with branded labels associated with merchant B. For instance, the notification may include information and have a look and feel as if it came directly from merchant B (e.g., merchant B logos, text, etc.) even though the notification originated from financial service provider 110.

Figure 4:
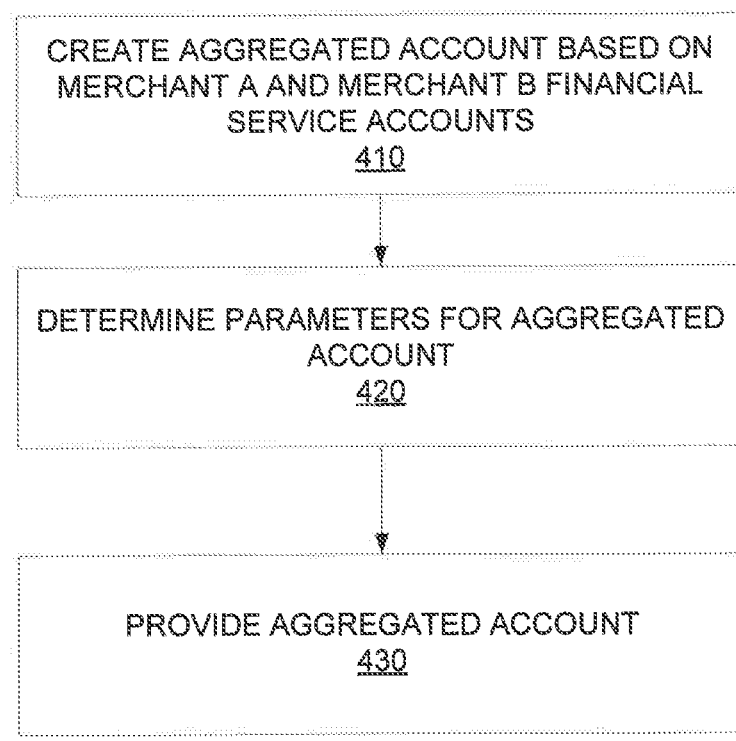
FIG. 4 is a flowchart of an exemplary aggregated financial service account generation process, consistent with disclosed embodiments.

FIG. 4 shows a flowchart of an exemplary aggregation account process consistent with certain disclosed embodiments. In step 410, financial service provider 110 (e.g., via server 111) may execute software that performs operations for creating an aggregated account based on the merchant A and merchant B private label accounts requested and approved for user 101. In one aspect, financial service account provider 110 may generate a single financial service account with separate records associated with the merchant A and merchant B private label accounts. Financial service account provider 110 may generate, as one example, a data structures) that maintains sub-accounts associated with the merchant A and merchant B private label accounts.

FIG. 5 shows a block diagram of an exemplary financial service account 500 including sub-accounts for the merchant A and merchant B private label accounts. The configuration, parameters, and format of financial service account 500 are exemplary and are not limiting to the disclosed embodiments. In one example, financial service account provider 110 may generate and store records for each merchant sub-account. Each sub-account may be associated with one or more parameters (e.g., parameters 305, 310, 315, 320, 325, and 330), that provide mechanisms for use of the sub-accounts by user 101. For example, financial service account 500 may include a sub-account for merchant A private label account with parameters for a credit limit (310), balance (315), payment due dates (320), payment amount (325), and percentage rate (330). When user 101 uses its merchant A private label account to make purchases with merchant A (e.g., account 203 shown in FIG. 2), financial service provider 110 may execute software to update and edit the parameters associated with the sub-account associated with the merchant A private label account. Similarly, when user 101 uses the merchant B private label account to make purchases with merchant B, financial service provider 110 may execute software to update and edit the parameters associated with the sub-account associated with the merchant B private label account.

In other embodiments, financial service provider 110 may be configured to execute software processes for creating another form of a single aggregated financial account for the multiple merchant private label accounts of user 101. FIG. 6 shows a block diagram of an exemplary financial service account 600 including an aggregated account record that is an aggregated form of the two private label accounts for merchant A and merchant B.

In one embodiment, financial service account provider 110 may generate and store records for each merchant sub-account. Each sub-account may be associated with one or more parameters (e.g., parameters 305, 310, 315, 320, 325, and 330), that provide mechanisms for use of the sub-accounts by user 101. For example, financial service account 500 may include a sub-account for merchant A private label account with parameters for a credit limit (310), balance (315), payment due dates (320), payment amount (325) and percentage rate (330). When user 101 uses its merchant A private label account to make purchases with merchant A (e.g., account 203 shown in FIG. 2), financial service provider 110 may execute software to update and edit the parameters associated with the sub-account associated with the merchant A private label account. Similarly, when user 101 uses the merchant B private label account to make purchases with merchant B, financial service provider 110 may execute software to update and edit the parameters associated with the sub-account associated with the merchant B private label account.

Figure 7:
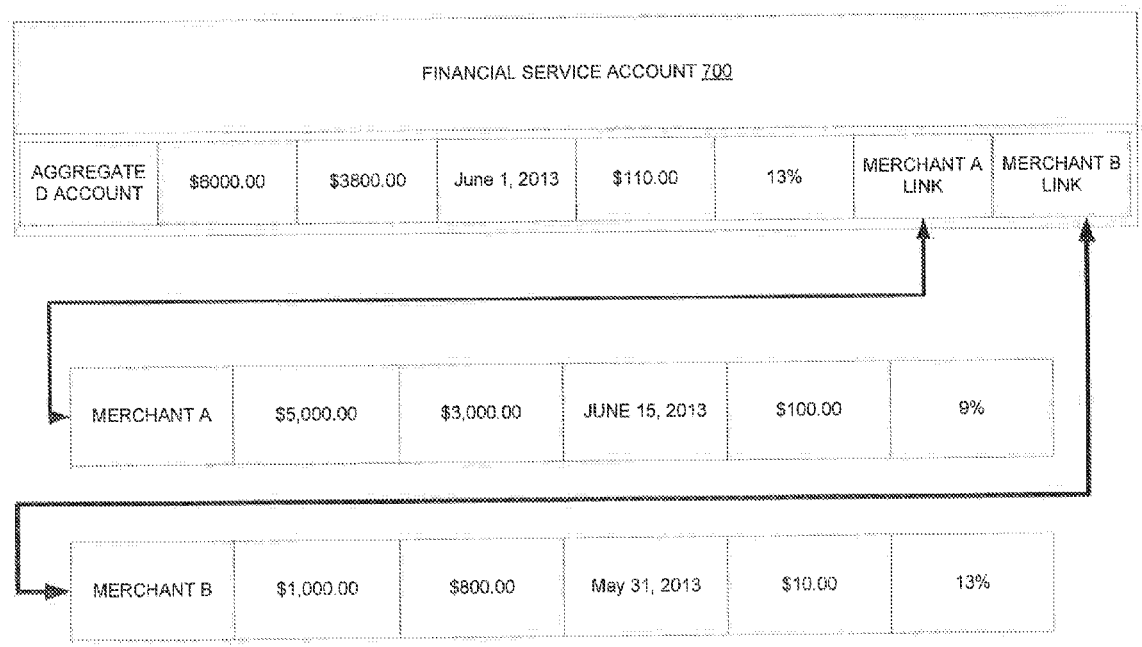
FIG. 7 is a block diagram of another exemplary data structure associated with a financial service account, consistent with certain disclosed embodiments.

The configuration, parameters, and format of financial service account 600 are exemplary and are not limiting to the disclosed embodiments. For instance, while FIG. 6 shows the data structure for financial service account 600 including records for merchant A and merchant B, the disclosed embodiments may include configurations where financial service provider 111 (or another entity) generates a data structure for financial service account 600 that does not include fields or records for each merchant private label account. For instance, separate data records may be created for each sub-account associated with a merchant private label account and linked to a common aggregate account, such as that exemplified in FIG. 7. In other embodiments, financial service provider 110 may not generate any sub-accounts for the merchant A and B private label accounts and instead generate a single aggregated account including parameters and information reflecting the two private label merchant accounts. The disclosed embodiments are not limited to any particular configuration or format of the data structures generated and stored by financial service account provider 110 (or any other entity of system 100). Database formats, data types, linked fields, and other forms of known data record management operations may be implemented by the disclosed embodiments to create, maintain, and manage the aggregated and private label financial service accounts disclosed herein.

Returning to FIG. 4, in certain embodiments, financial service provider 110 may execute software processes that determine one or more parameters for the aggregated account relating to private label merchant accounts of a given user (step 420). In one embodiment, financial service account provider 110 may determine the parameters for each sub-account for the merchant A and B private label accounts (e.g., such as the sub-accounts for financial account 500 shown in FIG. 5). Financial service provider 110 may consider one or more predetermined account parameters set forth by a given merchant 150 in offers provided to user 101 for a private label account. For example, merchant 150A may provide an offer to user 101 (e.g., via server 151A and client 120) that identifies one or more of the parameters for the private label account offered by merchant 150A (e.g., percentage rate of 9%, a credit limit of $5000.00, etc.). In other aspects, one or more of the parameters for a private label merchant account may not be known or provided to user 101 at the time user 101 applies for the private label account. In these embodiments, financial service provider 110 may execute software processes (via server 111) that determines the one or more parameters based on, for example, rules or conditions set by merchants 150 (e.g., merchant 150A and/or 150B) or by financial service provider 111.

In one embodiment, financial service provider 110 executes software instructions (via server 111) that determines parameters for a single aggregated financial account based on the parameters for the private label accounts associated with merchants 150A and 150B (and any others that may be included). For example, financial service provider 110 may determine an aggregated account balance parameter that reflects the total amount user 101 may use the aggregated account for purchasing goods and/or services from merchants 150A and 150B. In one aspect, the account balance parameter may be linked to the account balance parameters for each merchant private label sub-account. Thus, for example, financial service account provider 110 may be configured to track and deny purchase transactions that involve purchases that exceed the allocated balance for a given merchant. For example, financial service account provider 110 may configure the aggregated account such that the balance parameter for the merchant B sub-account is checked if user 101 attempts to purchase goods from merchant B. Financial service provider 110 may use merchant identity information provided by a merchant 150 when processing a purchase transaction by user 101 using an aggregated financial account.

Financial service account provider 110 may also set one or more parameters for the aggregated account or merchant-specific account based on other factors, such as merchant category information, merchant identity, specific store locations for merchant(s) 150, geographical location, etc. When processing applications for any given private label card, financial service account provider 110 (via, for example, server 111) may use any combination of these or other factors to determine eligibility for an account, or values for any of the account parameters described. Similarly, financial service account provider 110 (via e.g., server 111) may at any time modify any of these parameters based on any combination of the aforementioned or other factors. Such modifications may include, but are not limited to, changes to credit lines, interest rates, billing and payment settings, etc. Financial services provider 110 may also at any time terminate the extension of credit either temporarily for a defined or undefined time period, or permanently, based on any combination of such factors etc. In certain aspects, server 111 may be configured to execute software processes that analyze the above exemplary factors to determine whether to terminate the extension of credit as disclosed above.

Once financial service provider 110 determines the parameters for the aggregated account (step 420), it may provide the aggregated account to user 101 (step 430). In one embodiment, financial service provider 110 may provide the aggregated account in the form of an electronic account that can be used online for online purchases with any merchants that are associated with the aggregated account (e.g., merchants 150A and 150B). The aggregated account may be configured such that it can only be used for transactions with the specific merchants associated with the aggregated account. In another embodiment, financial service provider 110 may generate and provide a physical financial service account card that is usable at locations for merchants associated with the aggregated account (e.g., brick and mortar locations for merchants 150A and 150B). Financial service provider 110 may provide the aggregated account directly to user 101. In some aspects, the account may be provided via a notification (e.g., email, text, link to web page, etc.) including information with brand labels associated with merchants 150A or merchant 150B, or both. Any physical financial service account cards may also be branded with information associated with merchants 150A and 150B (e.g., the card may include logos for merchant 150A and/or merchant 150B). In other embodiments, financial service provider 110 may issue a separate financial service account card for merchant 150A and merchant 150B. Thus, in one example, user 101 may receive one financial service card for use with merchant 150B and a separate financial service card for use with merchant 150A. Logically, however, financial service account 110 may relate any purchases using the separate cards, which may be notified by merchants 150A and 150B, with the single aggregated account. In this example, user 101 may hold two separate financial service account cards (one for merchant 150A and one for merchant 150B), but transactions and other financial account management services associated with the two cards are processed by financial service account provider 110 as single aggregated account.

In other embodiments, merchant 150A may be configured to provide notification of the aggregated account to user 101 (via, for example, server 151A and client 120). Similarly, merchant 150B may be configured to provide notification of the aggregated account to user 101 (via, for example, server 151B and client 120). The notification may include information that informs user 101 that the private label account for merchant 150A has been approved, information describing one or more of the parameters for the private label merchant account, etc.

The disclosed embodiments also provide processes that allow an existing private label financial service account to be configured as an aggregated account that may be used to purchase goods and/or services from more than one merchant 150. For example, the disclosed embodiments may generate and provide a private label merchant account for user 101 for merchant 150A in a manner consistent with the operations described above. Sometime later, user 101 may apply for another private label merchant account from merchant 150B. In this example, merchant 150B and merchant 150A may have an agreement that allows financial service provider 110 to aggregate private label accounts with certain other merchants, such as merchants 150A and 150B. For example, merchant 150A may be a merchant that provides coffee (e.g., a coffee shop) and merchant B may be a retailer that sells coffee making appliances (e.g., a home goods store). These exemplary merchants may negotiate and agree to arrangements where financial service provider 110 processes and manages financial service accounts on behalf of the merchants. In exchange, the merchants allow the financial service provider 110 to generate aggregated financial accounts for user 101 that is usable at the partnered merchant sites in a manner consistent with the disclosed embodiments. Thus, in this example, financial service provider 110 may provide a replacement card to user 101 that is usable by user at the two exemplary merchant sites (e.g., merchant A coffee shop and merchant B home goods store). The replacement card may include branded labels associated with the two exemplary merchants. Alternatively, the disclosed embodiments may not replace an existing card held by the user (e.g., coffee shop card), but instead may notify the user (via client 120 or other means) that the existing card is now usable at the other merchant (e.g., the home goods store).

Figure 8:
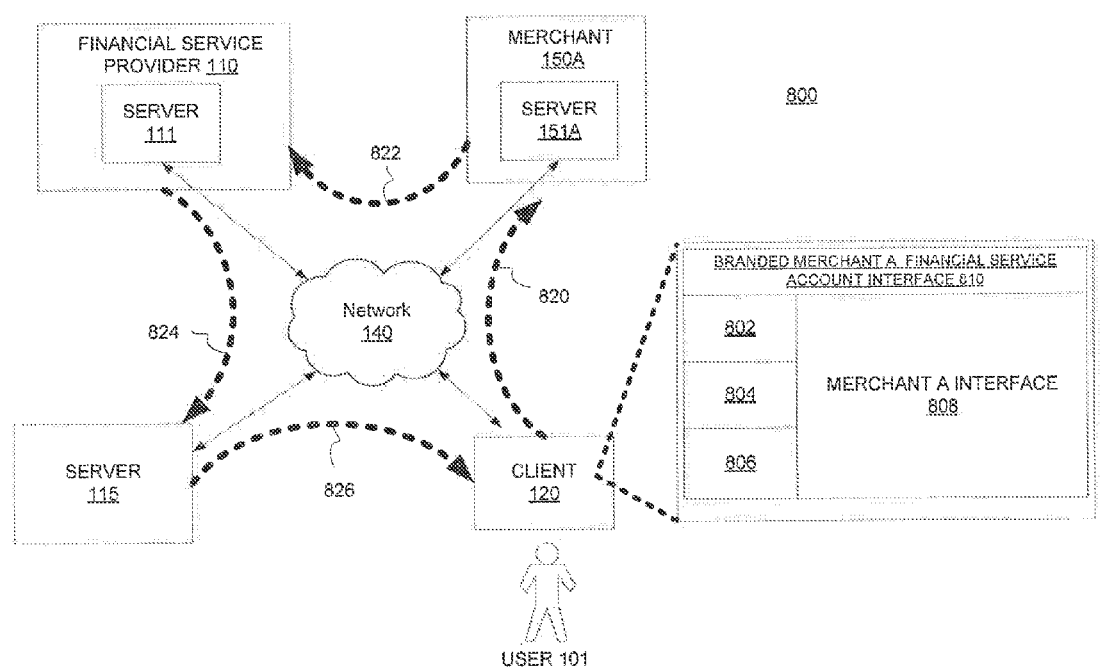
FIG. 8 is a block diagram on an exemplary process associated with certain aspects of the disclosed embodiments.

FIG. 8 shows a block diagram of system 800 that may be used to perform private label financial card processes consistent with certain disclosed embodiments. As explained, user 101 may use client 120 to access a web site provided by merchant 150A (via, for example server 151A or other server) to apply for a private label merchant account. Client 120 may, based on input from user 101, issue a request 820 for applying for the account. In response, server 151A (or another server) may provide client 120 with an interface 810 that is branded with merchant A information (e.g., merchant A logos, text, graphics, etc.). Interface 810 may include content 802, 804, and 806 that may include advertisements, links to one or more services offered by merchant 150A, financial service provider 110, or other entities. Interface 810 may include an interface 808 that enables user 101 to enter information for applying for the merchant A private label card.

In another embodiment, instead of merchant 150A providing interface 810, merchant 150A may forward the request 820 to financial service provider 110 via request 822. Request 822 may be a new request generated by server 151A that includes information relating to user 101 and/or client 120 such that other components may communicate with client 120. In response to request 822, financial service provider 110 may generate information used for applying for the new merchant A private label account. In one aspect, financial service provider 110 (e.g., via server 111) may send a request to 824 to a server 115 that may be configured to generate content (e.g., in the form of a web page or similar online location) that is provided to client 120 via communication 826. In this example, server 115 may generate interface 810 with the branded information associated with merchant A. Server 115 may be remote to financial service provider 110 or may be included with financial service provider 110. Thus, in certain embodiments, financial service provider 110 may perform back-end processes that generate and provide interface(s) (such as interface 810) to client 120 that have a look and feel as if they originated from merchant 150A, but are actually provided by financial service provider 110 (via server 111 and/or server 115).

Figure 9:
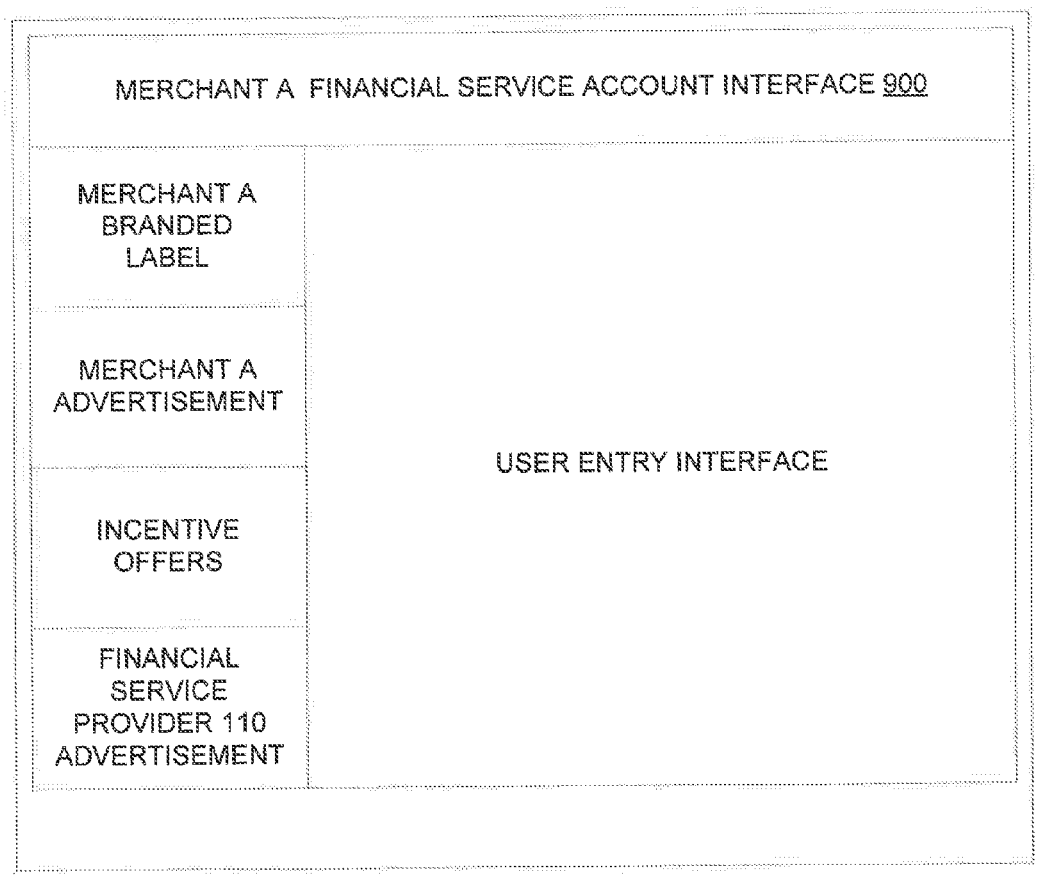
FIG. 9 shows an exemplary financial service account interface, consistent with certain disclosed embodiments.

The process flow associated with FIG. 8 may also be followed to allow user 101 to manage the merchant A private label account. For example, the disclosed embodiments may allow user 101 to perform online account management functions associated with the merchant A private label account held by user 101. In one example, user 101 may use client 120 to access a website associated with merchant 150A to perform account management functions. The web site may have an address affiliated with merchant 150A (e.g., www.merchantA/privatelabelaccountmanagement/), but is provided by financial service provider 110 via server 115. Financial service account 110 may provide interface(s) that user 101 may use (via client 120) to perform different account functions, such as paying bills, reviewing statements, etc. The interface may be branded as a merchant A interface. FIG. 9 shows an exemplary interface 900 that may be provided by financial service provider 110 that includes content associated with merchant A.

Figure 10:
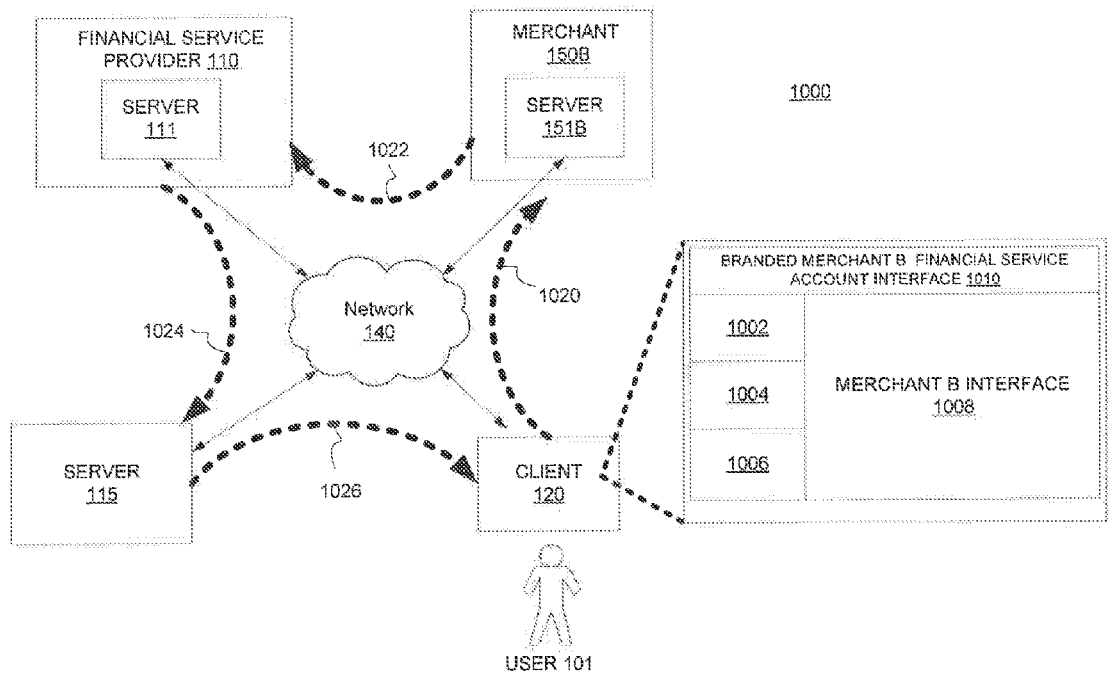
FIG. 10 is a block diagram on an exemplary process associated with certain aspects of the disclosed embodiments.

The disclosed embodiments may allow similar processes to be performed for merchant B private label accounts. FIG. 10 shows a block diagram of an exemplary system 1000 that may be used to perform private label financial card processes consistent with certain disclosed embodiments. As explained, user 101 may use client 120 to access a web site provided by merchant 150B (e.g., via server 151B or other server) to apply for a private label merchant account. Client 120 may, based on input from user 101, issue a request 1020 for applying for the account. In response, server 151B (or another server) may provide client 120 with an interface 1010 that is branded with merchant B information (e.g., merchant B logos, text, graphics, etc.). Interface 1010 may include content 1002, 1004, and 1006 that may include advertisements, links to one or more services offered by merchant 150B, financial service provider 110, or other entities. Interface 1010 may include an interface 1008 that enables user 101 to enter information for applying for the merchant A private label card.

In another embodiment, instead of merchant 150B providing interface 1010, merchant 150B may forward the request 1020 to financial service provider 110 via request 1022. Request 1022 may be a new request generated by server 151B that includes information relating to user 101 and/or client 120 such that other components may communicate with client 120. In response to request 1022, financial service provider 110 may generate information used for applying for the new merchant A private label account. In one aspect, financial service provider 110 (e.g., via server 111) may send a request to 1024 to a server 115 that may be configured to generate content (e.g., in the form of a web page or similar online location) that is provided to client 120 via communication 1026. In this example, server 115 may generate interface 1010 with the branded information associated with merchant B. Server 115 may be remote to financial service provider 110 or may be included with financial service provider 110. Thus, in certain embodiments, financial service provider 110 may perform back end processes that generate and provide interface(s) (such as interface 1010) to client 120 that have a look and feel as if they originated from merchant 150B, but are actually provided by financial service provider 110 (via server 111 and/or server 115).

The process flow associated with FIG. 10 may also be followed to allow user 101 to manage the merchant B private label account. For example, the disclosed embodiments may allow user 101 to perform online account management functions associated with the merchant B private label account held by user 101. In one example, user 101 may use client 120 to access a website associated with merchant 150B to perform account management functions. The web site may have an address affiliated with merchant 150B (e.g., www.merchantB/privatelabelaccountmanagement/), but is provided by financial service provider 110 via server 115. Financial service account 110 may provide interface(s) that user 101 may use (via client 120) to perform different account functions, such as paying bills, reviewing statements, etc. The interface may be branded as a merchant B interface.

Figure 11:
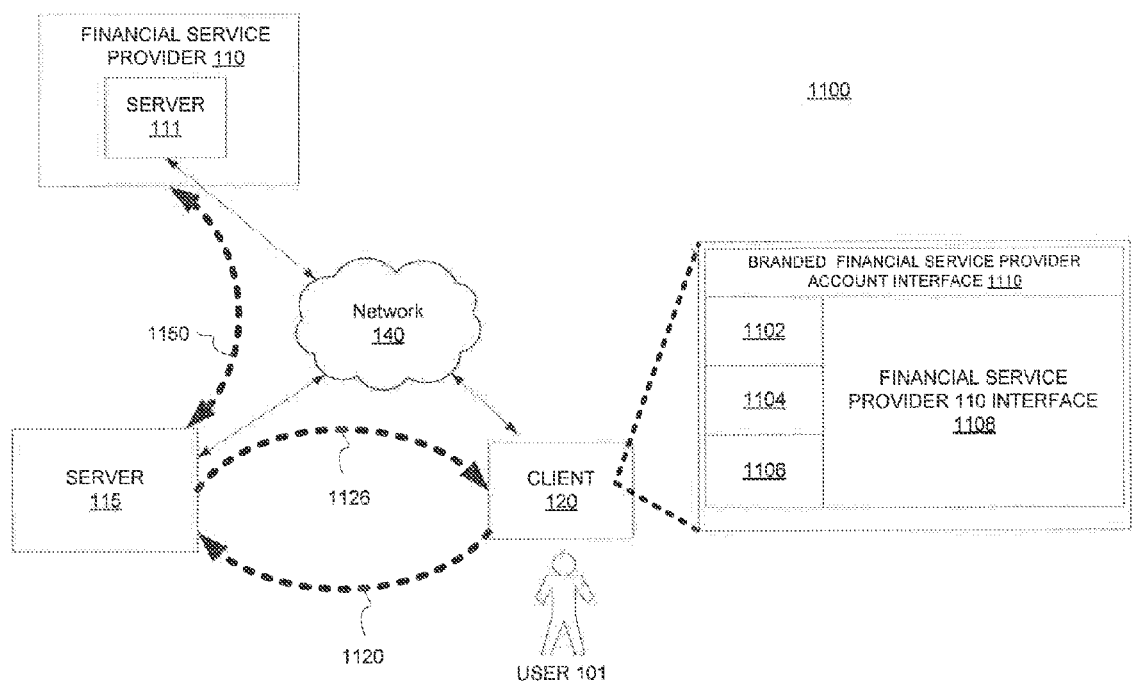
FIG. 11 is a block diagram on an exemplary process associated with certain aspects of the disclosed embodiments.

FIG. 11 shows a block diagram of an exemplary system 1100 that may be used to perform private label financial card processes consistent with certain disclosed embodiments. In certain aspects, user 101 may use client 120 to access a web site provided by financial service provider 110 (e.g., via server 111, server 115, or other servers) to apply and/or manage an aggregated financial service account associated with private label merchant accounts. In one example, client 120 may, based on input from user 101, issue a request 1120 for applying for the aggregated account. In response, server 115 (or another server) may forward the user input information via communication 1150 to financial service provider 110. Financial service provider 110 may perform approval processes or account management processes consistent with the disclosed embodiments. Financial service provider 110 may use server 115 to generate and provide interface(s), such as interface 1110, to client 120 for receiving and providing information relating to the aggregated account. In one aspect, server 115 may provide client 120 with an interface 1110 that is branded with financial service provider 110 information (e.g., logos, text, graphics, etc.) and/or with information associated with merchant A and/or merchant B. Interface 1110 may include content 1102, 1104, and 1106 that may include advertisements, links to one or more services offered by financial service provider 110, or other entities, such as merchant 150A and/or merchant 150B. Interface 1110 may include an interface 1108 that enables user 101 to enter information for applying or requesting information relating to an aggregated financial service account consistent with the disclosed embodiments.

Server 115 may be remote to financial service provider 110 or may be included with financial service provider 110. Thus, in certain embodiments, financial service provider 110 may perform back end processes that generate and provide interface(s) (such as interface 1110) to client 120 that have a look and feel as if they originated from financial service provider 1110, merchant 150A, merchant 150B, or a combination of these.

The process flow associated with FIG. 10 may also be followed to allow user 101 to manage the merchant B private label account. For example, the disclosed embodiments may allow user 101 to perform online account management functions associated with the merchant B private label account held by user 101. In one example, user 101 may use client 120 to access a website associated with merchant 150B to perform account management functions. The web site may have an address affiliated with merchant 150B (e.g., merchantB/privatelabelaccountmanagement/), but is provided by financial service provider 110 via server 115. Financial service account 110 may provide interface(s) that user 101 may use (via client 120) to perform different account functions, such as paying bills, reviewing statements, etc. The interface may be branded as a merchant B interface.

Figure 12:
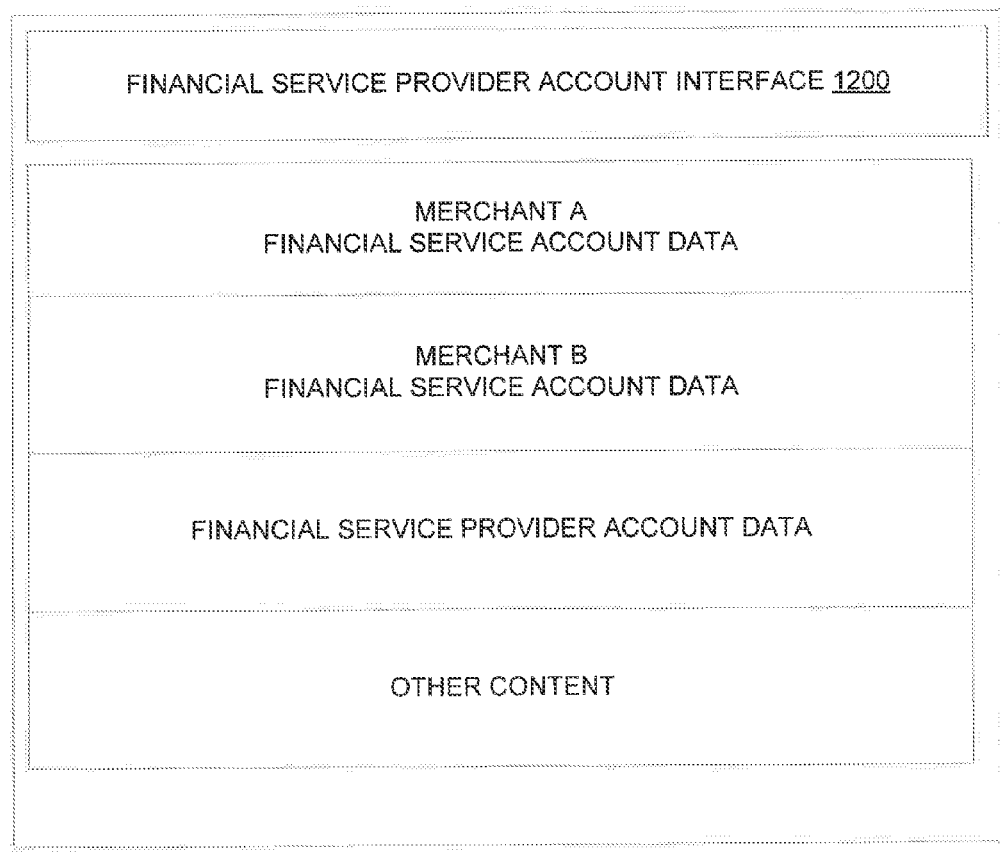
FIG. 12 shows an exemplary financial service account interface, consistent with certain disclosed embodiments.

As explained, aspects of the disclosed embodiments provide an aggregated account associated with multiple private label financial accounts. In certain aspects, financial service provider 110 (via server 111, server 115, both, or other server(s)) may provide a central location for user 101 to manage multiple private label financial accounts via an aggregated account provided by financial service provider 110. FIG. 12 shows an exemplary interface 1200 that may be provided by financial service provider 110 consistent with an aggregated account provided by certain disclosed embodiments. Interface 1200 may include, as an example, content including data associated with merchant A financial service account, data associated with merchant B financial service account, and financial service provider account data. Other content may also be provided in interface 1200, such as advertisements, links, graphics, text, etc. associated with merchant A, merchant B, and/or financial service provider 110.

Figure 13:
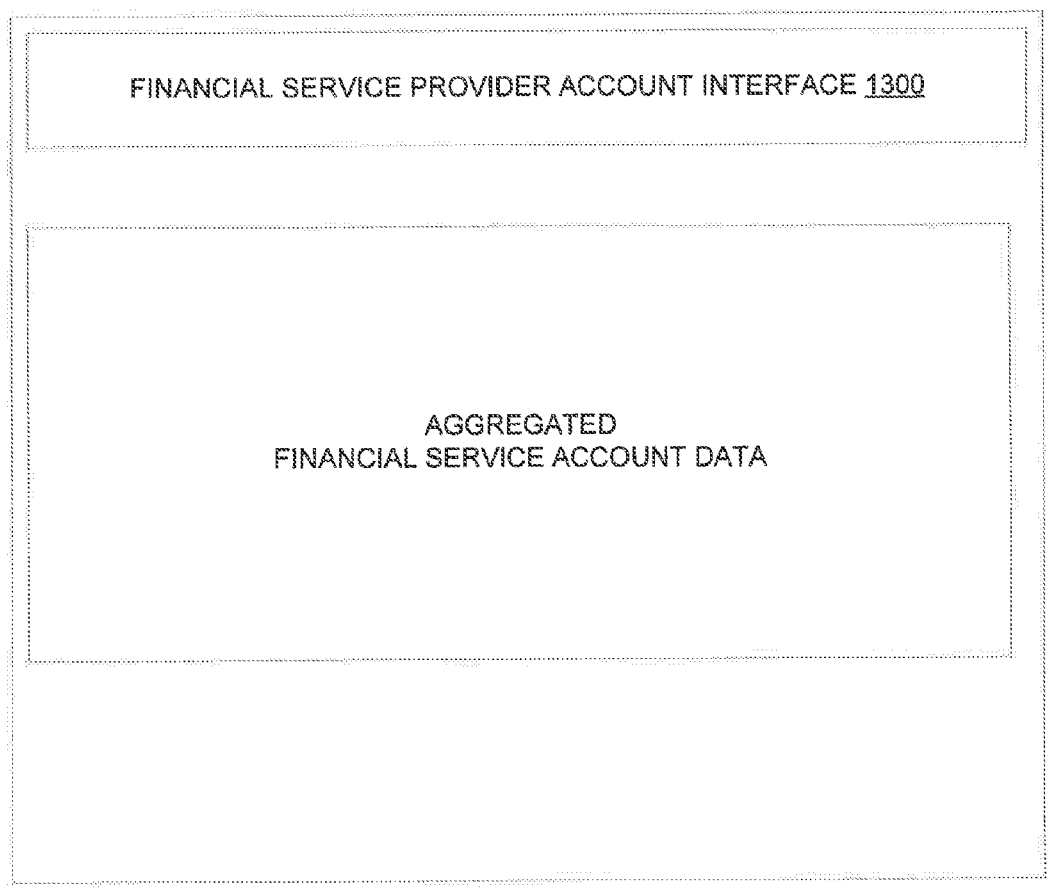
FIG. 13 shows another exemplary financial service account interface, consistent with certain disclosed embodiments.

FIG. 13 shows another exemplary interface 1300 that may be provided by financial service provider 110 consistent with an aggregated account provided by certain disclosed embodiments. Interface 1300 may include, as an example, content including data associated with an aggregated financial service account provided by financial service account provider 110 consistent with disclosed embodiments. Interface 1300 may include interfaces that are dynamically generated based on different types of account management functions, such as billing, statement review, account reward tracking, etc.

As explained, in certain aspects, the disclosed embodiments allow user 101 to manage private label accounts for different merchants. Merchants 150A and 150B may collaborate with financial service provider 110 to allow financial service account 110 to generate and provide interfaces on behalf of merchants 150A and 150B for managing respective private label accounts. Thus, merchant 150A, for example, may advertise online banking services for its merchant A private label accounts without having to provide the backend processes for maintaining and managing such accounts. Instead, financial service provider 110 may generate and provide online locations that user 101 may access (via client 120) that are branded as merchant A locations.

Figure 14:
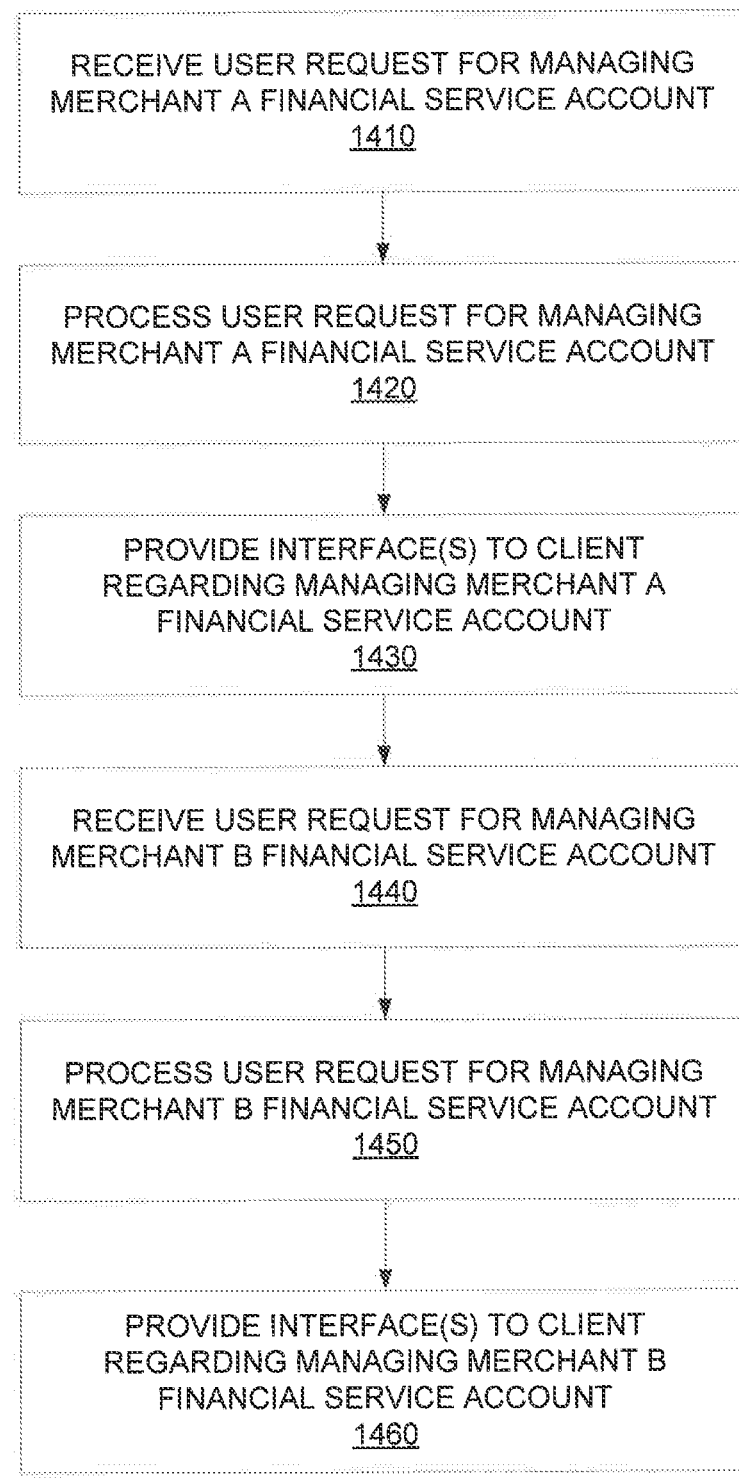
FIG. 14 is a flowchart of an exemplary financial service account managing process, consistent with disclosed embodiments.

FIG. 14 shows a flowchart of an exemplary account management process consistent with certain disclosed embodiments. In step 1410, merchant 150A (via server 151A) may receive a request from user 101 for managing a merchant A private label account held by user 101. In one aspect, client 120 may send the request to server 151A over network 140. For instance, merchant 150A may provide a web site that offers services associated with the business affiliated with merchant 150A. The web site may include a link that, when selected by user 101 via client 120, redirects user 101 to a web site provided by financial service provider 110 (via, for example, server 115). Step 1410 may also reflect the step of financial service provider 110 receiving a request from merchant 150A for managing the merchant A private label account.

In step 1420, financial service provider 110 may process the user request for managing the merchant A private label financial account. Processing the account may include determining what operations user 101 is requesting to do based on input or selections by user 101 on an interface provided via client 120. In certain aspects, depending on the preferences of user 101, financial service account provider 110 may provide one or more interface(s) over network 140 to client 120 for display to user 101 (step 1430). Financial service account provider 110 may configure the interface(s) with a look and feel associated with merchant A. For example, user 101 may use the disclosed embodiments to make payments toward a balance on merchant A private label account. In these aspects, financial service provider 110 may generate merchant A branded interface(s) that allow user to make online payments toward the merchant A financial service account. Financial service account provider 110 processes the payment and edits the information associated with the merchant A subaccount associated with user 101's aggregated account.

In similar fashion, user 101 may use client 120 to access a web site provided by merchant 150B. In step 1440, merchant 150B (via server 151B) may receive a request from user 101 for managing a merchant B private label account held by user 101. In one aspect, client 120 may send the request to server 151B over network 140. For instance, merchant 150B may provide a web site that offers services associated with the business affiliated with merchant 150B. The web site may include a link that, when selected by user 101 via client 120, redirects user 101 to a web site provided by financial service provider 110 (e.g., via server 115). Step 1440 may also reflect the step of financial service provider 110 receiving a request from merchant 150B for managing the merchant A private label account.

In step 1450, financial service provider 110 may process the user request for managing the merchant B private label financial account. Processing the account may include determining what operations user 101 is requesting to do based on input or selections by user 101 on an interface provided via client 120. In certain aspects, depending on the preferences of user 101, financial service account provider 110 may provide one or more interface(s) over network 140 to client 120 for display to user 101 (step 1460). Financial service account provider 110 may configure the interface(s) with a look and feel associated with merchant B. For example, user 101 may use the disclosed embodiments to make payments toward a balance on merchant B private label account. In these aspects, financial service provider 110 may generate merchant B branded interface(s) that allow user to make online payments toward the merchant B financial service account. Financial service account provider 110 processes the payment and edits the information associated with the merchant B subaccount associated with user 101's aggregated account.

In certain embodiments, financial service provider 110 may provide an aggregated account that is configured based on one or more parameters associated with one or more private label financial accounts. For instance, as discussed above, financial service provider 110 may create an aggregated financial service account that is based on private label accounts from merchant 150A and merchant 150B. Financial service provider 110 may be configured to execute software that allows the parameters to be dynamically adjusted based on private label merchant accounts added for user 101. Aspects of the disclosed embodiments also provide a central means for managing multiple private label accounts.

Figure 15:
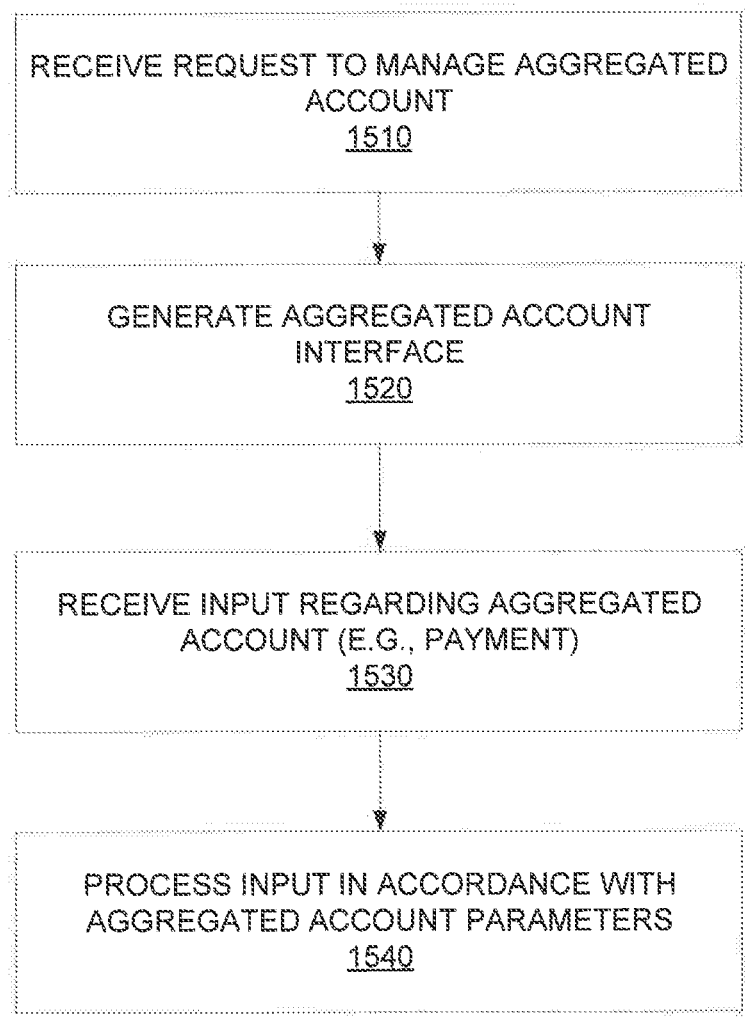
FIG. 15 is a flowchart of an exemplary aggregated financial service account managing process, consistent with disclosed embodiments.

FIG. 15 shows a flowchart of an exemplary aggregated account management process consistent with certain embodiments. In step 1510, financial service account 110 (e.g., via server 111) may receive a request to manage an aggregated account. The request may come from client 120 over network 140. In other embodiments, merchant 150A or merchant 150B may provide a link on their branded web site to access the aggregated account management functions offered by financial service provider 110.

Based on the request, financial service provider 110 (via server 111, server 115, both, or another server) may generate an aggregated account interface (step 1520). In one aspect, the aggregated account interface may include content such as that described above in connection with FIG. 13. Financial service provider 110 (via server 111, server 115, both, or another server) may generate the aggregated account interface to include options for managing the aggregated account. For example, the interface may include an option for user 101 to make a payment on the account. In certain aspect, financial service provider 110 may execute software processes that allow user 101 to make a single payment that is contributed toward multiple private label financial accounts. For example, financial service provider 110 may receive input regarding an aggregated account (step 1530). Based on the input, financial service provider 110 may process user 101's input in accordance with the aggregated account parameters (step 1540). For instance, user 101's input may reflect a desire to make a payment toward a balance associated with merchant A private label account. In embodiments where financial service account 110 provides a single aggregated account that encompasses both merchant A and merchant B private label accounts, financial service provider 110 may process the user 101's payment such that the balance for both private label accounts are adjusted. For example, a user 101's $100 payment may be split between the balance associated with both merchant A and merchant B's sub-accounts associated with the aggregated account. In other aspects, financial service provider 110 may apply the payment to a single balance parameter associated with the aggregated financial account. In this way, user 101 need only make payments on a single account that effectively cover two private label accounts.

Figure 16:
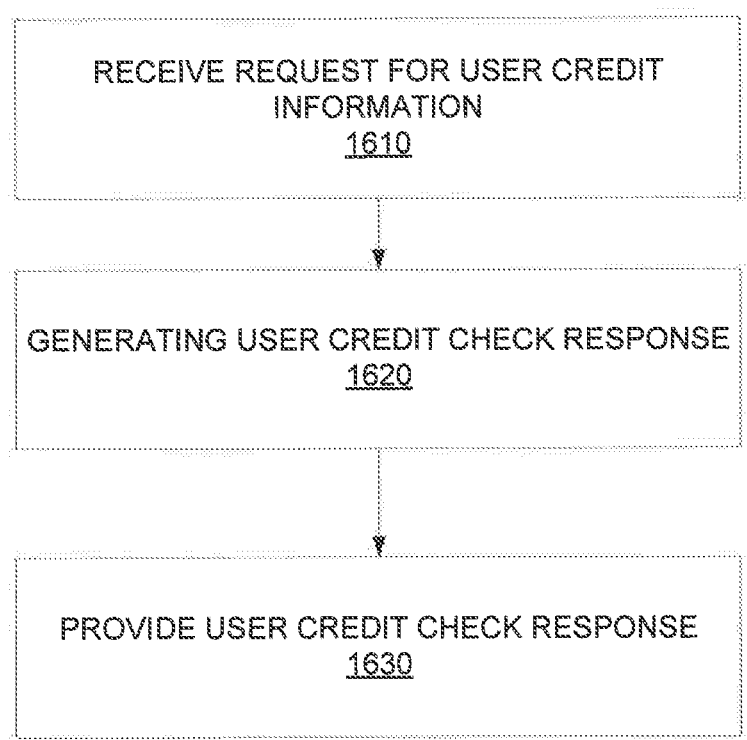
FIG. 16 is a flowchart of an exemplary credit checking process, consistent with disclosed embodiments.

The disclosed embodiments also provide advantages from a credit assessment perspective. In one aspect, financial service provider 110 may provide an aggregated account process that generates a single credit facing credit account that is based on multiple private label accounts. Thus, the credit exposure to user 101 is reduced through use of an aggregated financial account provided by the disclosed embodiments. For instance, FIG. 16 shows a flowchart of an exemplary credit check processing process consistent with certain disclosed embodiments. In step 1610, financial service provider 110 may receive a request for credit check information relating to user 101. The request may originate from credit assessor 160 or from another entity or device. In response, financial service account provider 110 may generate a credit check response associated with user 101 (Step 1620). The user credit check response may include information reflecting a single account held by user 101 for purposes for assessing credit exposure, despite financial service provider 110 providing an aggregated account reflecting multiple private label financial accounts. Financial service provider 110 may provide the user credit check response (step 1630) to the requesting entity or component (e.g., credit assessor 160) over network 140 or other communication means. Thus, in certain aspects, the disclosed embodiments a credit check from a credit bureau (e.g., credit assessor 160) may only be performed once, even if a user applies for several private label financial service accounts that may be aggregated into a single financial service account in accordance with the disclosed embodiments.

Other embodiments will be apparent to those skilled in the art from consideration of the specification and practice of the disclosed embodiments. It is intended that the specification and examples be considered as exemplary only, with a true scope and spirit of the disclosed embodiments being indicated by the following claims. For example, the disclosed embodiments are applicable to any type of financial account, such as, for example: private label/store credit financial accounts, but also private label debit, gift, prepaid, and other stored value accounts (e.g., rewards/loyalty points). In some embodiments, a credit financial account may include promotional financing, long term financing, transactional credit, and installment loans. Further, the disclosed embodiments are agnostic to the form factor for the financial service accounts disclosed herein, and the means for authenticating those accounts, e.g., plastic card, mini-card, RFID tags, mobile payments (NFC, QR/barcode), online/remote transactions, biometric authentication, etc.

In addition, the disclosed embodiments may be configured to enable the financial service accounts (e.g., aggregated accounts, private label accounts, etc.) to be managed within single wallet, several wallets, or separate web/mobile applications. For example, the disclosed embodiments may be configured to provide a wallet or collection of wallets/apps to provide a communication platform for merchant-to-consumer messaging, such as, for example, deals, discounts, promotions, brand marketing, and/or targeted marketing. Further, the disclosed embodiments may be configured to generate such messaging (via, e.g., server 111, server 151, or a combination of both). In one aspect, the disclosed embodiments may provide such messaging such that they can be targeted based on transaction data at all or a subset of participating merchants. The disclosed embodiments may be configured to provide targeting messaging that is informed by general purpose card spending by a consumer using the aggregated financial service accounts consistent with the disclosed embodiments. In other aspects, the disclosed embodiments may be configured to generate and provide messages based on real-time payments activity (e.g., generating and providing notifications immediately after check-out using an aggregated financial service account consistent with the disclosed embodiments). In other aspects, the disclosed embodiments may be configured to generate and provide follow-on recommendations messages, or generate and provide offers to users of the disclosed aggregated financial service accounts based on location/location-based check-ins, etc. (e.g., location of client 120, user 101, or both).

In addition, the disclosed embodiments may be configured to provide additional messaging and communications based on transaction data, product data (e.g., SKU data), inventory data, etc. relating to purchase transactions performed using the aggregated financial service account consistent with the disclosed embodiments. For example, the disclosed embodiments may be configured to generate and provide product-level messaging based on product data (e.g., SKU data) associated with purchase transactions made by a user with an aggregated financial service account consistent with the disclosed embodiments.

Further, the disclosed embodiments may be configured to provide a platform for product manufacturer communications and marketing. For instance, product manufacturers and brands (e.g., Nike, Levi's) may use the platform to send targeted communications and marketing messages to the user (e.g., promotions, local offers, group deals, brand communications, review requests, post-purchase messages, new product suggestions, event or group invitations, or any other messages promoting the brand or its products, or any other messages promoting the brand or products of affiliated manufacturers or brands). These messages may be based on, e.g., the user's transaction data, product reviews, location, merchant affiliations, etc. The user may also send messages (e.g., requests, reviews, comments, etc,) to the product manufacturers and brands, either by responding to their messages, or by initiating the messaging themselves.

What is claimed is:

1. A system for generating an aggregated account record for an aggregated financial account for a user associated with a plurality of distinct private label financial accounts, comprising:
   one or more memory devices storing software instructions and a plurality of private label financial account records; and
   one or more processors configured to execute the software instructions to:
      generate, for the aggregated financial account, a first sub-account record associated with a first private label financial account, the first private label account being usable for purchases associated with a first merchant but not for purchases associated with a second merchant, the first sub-account record including a plurality of parameters associated with the first private label financial account;
      generate, for the aggregated financial account, a second sub-account record associated with a second private label financial account, the second private label financial account being usable for purchases associated with the second merchant but not for purchases associated with the first merchant, the second sub-account record including a plurality of parameters associated with the second private label financial account;
      generate the aggregated account record for the aggregated financial account based on the first and the second sub-account records associated respectively with the first and the second private label accounts, such that the aggregated financial account is usable for purchases with the first merchant and for purchases with the second merchant, wherein of the aggregated account record includes:
         the first sub-account record;
         the second sub-account record; and
         a record including an aggregation of a corresponding one or more of the plurality of parameters associated with the first sub-account record and the second sub-account record;
      provide instructions to a user device to display an aggregated account graphical user interface, the interface being configured to access the aggregated account record to display content associated with the aggregated financial account, the first private label financial account, and the second private label financial account;
      receive, from the user device, responsive to an input on the aggregated account graphical user interface displayed thereon, a request to perform a task associated with the first private label financial account; and
      provide instructions to the user device to display a first account graphical user interface based on the received request to enable the task to be performed with respect to the first private label financial account, the first account graphical interface including at least one displayable element associated with the first merchant including a least one of a logo of the first merchant and first merchant branded text, such that the first account graphical interface appears to be associated with the first merchant.

2. The system of claim 1, wherein the task is providing payment toward a balance associated with the first private label financial account.

3. The system of claim 2, wherein the one or more processors are configured to adjust a balance parameter of the aggregated account record based on the payment associated with the first private label financial account.

4. The system of claim 3, wherein the one or more processors are further configured to:
   receive, from the user device, responsive to an input on the aggregated account graphical user interface displayed thereon, a request to perform a second task associated with the second private label financial account; and
   provide instructions to the user device to display a second account graphical user interface to allow the second task to be performed on the second private label financial account, the second account graphical interface including at least one displayable element associated with the second merchant including at least one of a logo of the second merchant and second merchant branded text, such that the second account graphical user interface appears to be associated with the second merchant.

5. The system of claim 4, wherein the second task is providing payment toward a balance associated with the second private label financial account and wherein the one or more processors are configured to adjust the balance parameter of the aggregated account record based on the payment associated with the second private label financial account.

6. A computer-implemented method for generating an aggregated account record for an aggregated financial account for a user associated with a plurality of distinct private label financial accounts, comprising:
   generating, by one or more processors, for the aggregated financial account, a first sub-account record including a plurality of parameters associated with a first private label financial account, the first private label financial account being usable for purchases associated with a first merchant but not for purchases associated with a second merchant;

generating, by the one or more processors, for the aggregated financial account, a second sub-account record including a plurality of parameters associated with a second private label financial account, the second private label financial account being usable for purchases associated with the second merchant but not for purchases associated with the first merchant;

generating, by the one or more processors, the aggregated account record for the aggregated financial account based on the first and second sub-account records associated respectively with the first and the second private label accounts, such that the aggregated financial account is usable for purchases with the first merchant and for purchases with the second merchant, wherein of the aggregated account record includes:
at least one field associated with a parameter of the first sub-account record;
at least one field associated with a parameter of the second sub-account record; and
at least one field corresponding to an aggregation of a corresponding one or more of the plurality of parameters associated with the first private label account and the second private label account; and providing instructions to a user device to display an aggregated account graphical user interface, the interface being configured to access the aggregated account record to display content associated with the aggregated financial account, the first private label financial account, and the second private label financial account;

receiving, from the user device, responsive to an input on the aggregated account graphical user interface displayed thereon, a request to perform a task associated with the first private label financial account; and providing instructions to the user device to display a first account graphical user interface based on the received request to enable the task to be performed with respect to the first private label financial account, the first account graphical interface including at least one displayable element associated with the first merchant including a least one of a logo of the first merchant and first merchant branded text, such that the first account graphical interface appears to be associated with the first merchant.

7. The method of claim 6, wherein receiving a request to perform the task associated with the first private label financial account further comprises:
receiving a request to provide payment toward a balance associated with the first private label financial account.

8. The method of claim 7, further comprising:
adjusting a balance parameter of the aggregated financial account based on the payment associated with the first private label financial account.

9. The method of claim 8, further comprising:
receiving, from the user device, responsive to an input on the aggregated account graphical user interface displayed thereon, a request to perform a second task associated with the second private label financial account; and
providing, by the one or more processors, instructions to the user device to display a second account graphical user interface to allow the second task to be performed on the second private label financial account, the second account graphical interface including at least one displayable element associated with the second merchant including at least one of a logo of the second merchant and second merchant branded text, such that the second account graphical user interface appears to be associated with the second merchant.

10. The method of claim 9, wherein the second task is providing payment toward a balance associated with the second private label financial account and wherein the method further comprises adjusting the balance parameter of the aggregated financial account based on the payment associated with the second private label financial account.

11. The system of claim 1, wherein the one or more processors are further configured to:
provide the instructions to the user device to display the aggregated account graphical user interface in response to receiving a request associated with the aggregated financial account.

12. The system of claim 11, wherein the one or more processors are further configured to:
receive, from the user device, responsive to an input on the aggregated account graphical user interface displayed thereon, a request to perform a task associated with the aggregated financial account;
provide, in response to receipt of the request, instructions to the user device to display an interface for receiving task parameters for performing the task associated with the aggregated financial account; and
adjust a parameter of the first private label financial account and a parameter of the second private label financial account based on received task parameters.

13. The method of claim 6, further comprising:
providing, by the one or more processors, the instructions to the user device to display the aggregated account graphical user interface in response to receiving a request associated with the aggregated financial account.

14. The method of claim 13, further comprising:
receiving a request, from the user device, responsive to an input on the aggregated account graphical user interface displayed thereon, to perform a task associated with the aggregated financial account;
providing, by the one or more processors, instructions to the user device to display an interface for receiving task parameters for performing the task associated with the aggregated financial account; and
adjusting a parameter of the first private label account and a parameter of the second private label financial account based on received task parameters.

15. The method of claim 14, wherein the task associated with the aggregated financial account corresponds to a payment toward a balance of the aggregated financial account, and wherein the method further comprises adjusting a balance parameter of the first private label account and a balance parameter of the second private label account based on the payment toward the balance of the aggregated financial account.

16. A computer-readable storage medium storing instructions that, when executed by a processor, cause the processor to perform operations for generating an aggregated account record for an aggregated financial account for a user associated with a plurality of distinct private label financial accounts, the operations comprising:
generating for the aggregated financial account, a first sub-account record including a plurality of parameters associated with a first private label financial account, the first private label financial account being usable for purchases associated with a first merchant but not for purchases associated with a second merchant;

generating for the aggregated financial account, a second sub-account record including a plurality of parameters associated with a second private label financial account, the second private label financial account being usable for purchases associated with the second merchant but not for purchases associated with the first merchant;

generating the aggregated account record for the aggregated financial account based on the first and second sub-account records associated respectively with the first and the second private label accounts, such that the aggregated financial account is usable for purchases with the first merchant and for purchases with the second merchant, wherein the aggregated account record includes:
- at least one field associated with a parameter of the first sub-account record;
- at least one field associated with a parameter of the second sub-account record; and
- at least one field corresponding to an aggregation of a corresponding one or more of the plurality of parameters associated with the first private label account and the second private label account; and providing instructions to a user device to display an aggregated account graphical user interface, the interface being configured to access the aggregated account record to display content associated with the aggregated financial account, the first private label financial account, and the second private label financial account;

receiving, from the user device, responsive to an input on the aggregated account graphical user interface displayed thereon, a request to perform a task associated with the first private label financial account; and providing instructions to the user device to display a first account graphical user interface based on the received request to enable the task to be performed with respect to the first private label financial account, the first account graphical interface including at least one displayable element associated with the first merchant including a least one of a logo of the first merchant and first merchant branded text, such that the first account graphical interface appears to be associated with the first merchant.

17. The computer-readable storage medium of claim 16, wherein the instructions further cause the processor to perform operations comprising:
receiving a request, from the user device, responsive to an input on the aggregated account graphical user interface displayed thereon, to apply a payment toward a balance of the aggregated financial account;
providing instructions to the user device to display an interface for receiving payment parameters associated with the request; and
adjusting a balance parameter of the first private label account and a balance parameter of the second private label financial account based on received payment parameters.

* * * * *

UNITED STATES PATENT AND TRADEMARK OFFICE
CERTIFICATE OF CORRECTION

PATENT NO. : 9,710,850 B2  
APPLICATION NO. : 14/089180  
DATED : July 18, 2017  
INVENTOR(S) : Hannes M. Jouhikainen et al.

Page 1 of 1

It is certified that error appears in the above-identified patent and that said Letters Patent is hereby corrected as shown below:

In the Claims

Claim 1, Column 19, Lines 65-66, "wherein of the aggregated account" should read -- wherein the aggregated account --.

Claim 6, Column 21, Line 18, "wherein of the aggregated account" should read -- wherein the aggregated account --.

Claim 6, Column 21, Line 43, "including a least one" should read -- including at least one --.

Signed and Sealed this  
Seventeenth Day of October, 2017

Joseph Matal  
*Performing the Functions and Duties of the*  
*Under Secretary of Commerce for Intellectual Property and*  
*Director of the United States Patent and Trademark Office*